United States Patent [19]
Dennis et al.

[11] 3,940,610
[45] Feb. 24, 1976

[54] NATURAL GAMMA RADIATION BOREHOLE LOGGING SYSTEM

[75] Inventors: Charles L. Dennis, De Soto; Wyatt W. Givens, Dallas; John B. Hickman, Grand Prairie, all of Tex.

[73] Assignee: Mobil Oil Corporation, New York, N.Y.

[22] Filed: Feb. 15, 1974

[21] Appl. No.: 443,073

[52] U.S. Cl. ............... 250/253; 250/262; 250/369
[51] Int. Cl.² .................... G01V 5/00; G01T 1/20
[58] Field of Search ........... 250/261, 252, 253, 262

[56] References Cited
UNITED STATES PATENTS

| | | | |
|---|---|---|---|
| 2,529,666 | 11/1950 | Sands | 328/117 |
| 2,562,968 | 8/1951 | Teichmann et al. | 250/253 |
| 2,897,368 | 7/1959 | Lundberg et al. | 250/253 |
| 3,105,149 | 9/1963 | Guitton et al. | 250/253 |

*Primary Examiner*—Harold A. Dixon
*Attorney, Agent, or Firm*—C. A. Huggett; George W. Hager, Jr.

[57] ABSTRACT

A borehole logging system employs a gamma-ray detector for measuring the natural gamma radiation of the earth formations surrounding a borehole. Three energy band selectors, each employing a discriminator and count rate meter, separate the output of the gamma-ray detector into potassium, uranium, and thorium energy band signals. A first operational amplifier determines the difference between the potassium energy band signal and those portions of the uranium and thorium energy band signals which represent the influence of uranium and thorium gamma radiation within the potassium energy band, this difference representing the correct potassium gamma radiation. A second operational amplifier determines the difference between the uranium energy band signal and that portion of the thorium energy band signal which represents the influence of the thorium gamma radiation within the uranium energy band, this difference representing the correct uranium gamma radiation. A third operational amplifier determines the difference between the thorium energy band signal and that portion of the uranium energy band signal which represents the influence of the uranium gamma radiation within the thorium energy band, this difference representing the correct thorium gamma radiation.

7 Claims, 4 Drawing Figures

NATURAL GAMMA RADIATION BOREHOLE LOGGING SYSTEM

BACKGROUND OF THE INVENTION

This invention relates to a method and apparatus for nuclear well logging and more particularly the calibration of a borehole logging tool utilized to measure the radioactive response of subsurface formations penetrated by a borehole.

Various methods and apparatus have been utilized in the well logging art to study the radioactive properties of subsurface formations, both where the radioactivity is natural and where it is artificially induced. Logs of such properties aid in the study of the nature of the subsurface formations, particularly in exploration for minerals and hydrocarbon deposits. Certain elements in the subsurface formations exhibit distinctive properties which are measurable in situ. Of the many elements that occur, potassium (K), uranium (U), and thorium (Th) are important natural sources of gamma radiation. Each of these elements either contains or radioactively decays to, radioactive isotopes which emit gamma radiation at characteristic energy levels. The natural gamma-ray spectrum of a given formation therefore exhibits peaks of intensity at energies corresponding to the potassium, uranium, and thorium content of the formation.

SUMMARY OF THE INVENTION

A borehole logging system determines the amount of natural gamma radiation from potassium, uranium, and thorium in the earth formations surrounding a borehole. A gamma-ray detector provides a measurement of the total natural gamma radiation within the borehole. Three energy band selectors discriminate this measurement of the gamma-ray detector into potassium, uranium, and thorium energy band signals centered about the energy levels at which potassium, uranium, and thorium exhibit peak gamma radiation intensities.

These potassium, uranium, and thorium energy band signals are then applied to a stripping unit having potassium and uranium channels. The potassium channel strips the potassium gamma radiation measurement, as represented by the potassium energy band signal, of the influence from the gamma radiation from uranium and thorium. Further, the uranium channel strips the uranium gamma radiation measurement, as represented by the uranium energy band signal, of the influence from the gamma radiation from thorium.

More particularly, the uranium channel of the stripping unit includes an operational amplifier having one input supplied by the uranium energy band signal and a second input supplied by the thorium energy band signal through a variable resistance, such resistance being set such that the output of the amplifier is zero when the gamma-ray detector is exposed to a source of thorium gamma radiation and is representative of the uranium energy band signal stripped of the influence of any thorium gamma radiation when the gamma-ray detector is exposed to the natural gamma radiation of the earth formations surrounding the borehole.

The potassium channel of the stripping unit includes an operational amplifier having one input supplied by the potassium energy band signal and a second input supplied by the uranium energy band signal through a variable resistance and also by the thorium energy band signal through a variable resistance, such resistances being set such that the output of the amplifier is zero when the gamma-ray detector is exposed to either a source of uranium gamma radiation or a source of thorium gamma radiation and is representative of the potassium energy band signal stripped of the influence of any uranium or thorium gamma radiation when the gamma-ray detector is exposed to the natural gamma radiation of the earth formations surrounding the borehole.

In a further aspect, the stripping unit further includes a thorium channel which strips the thorium gamma radiation measurement, as represented by the thorium energy band signal, of the influence of the lower energy gamma radiation element uranium. More particularly, the thorium channel includes an operational amplifier having one input supplied by the thorium energy band signal and a second input supplied by the uranium energy band signal through a variable resistance, such resistance being set such that the output of the amplifier is zero when the gamma-ray detector is exposed to a source of uranium gamma radiation and is representative of the thorium energy band signal stripped of the influence of any uranium gamma radiation when the gamma-ray detector is exposed to the natural gamma radiation of the earth formations surrounding the borehole.

DESCRIPTION OF THE PREFERRED EMBODIMENT

Figure 1:
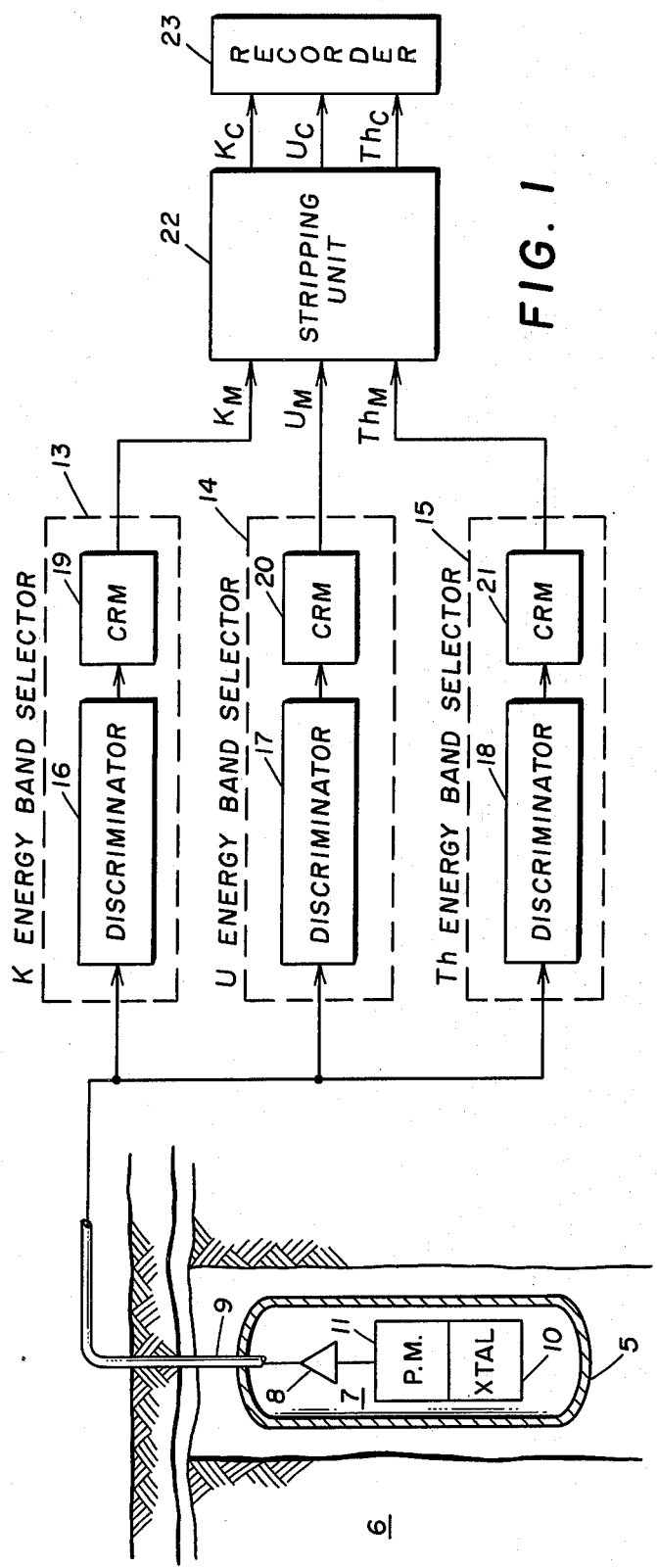
FIG. 1 illustrates the natural gamma radiation borehole logging system of the present invention.
Figure 2:
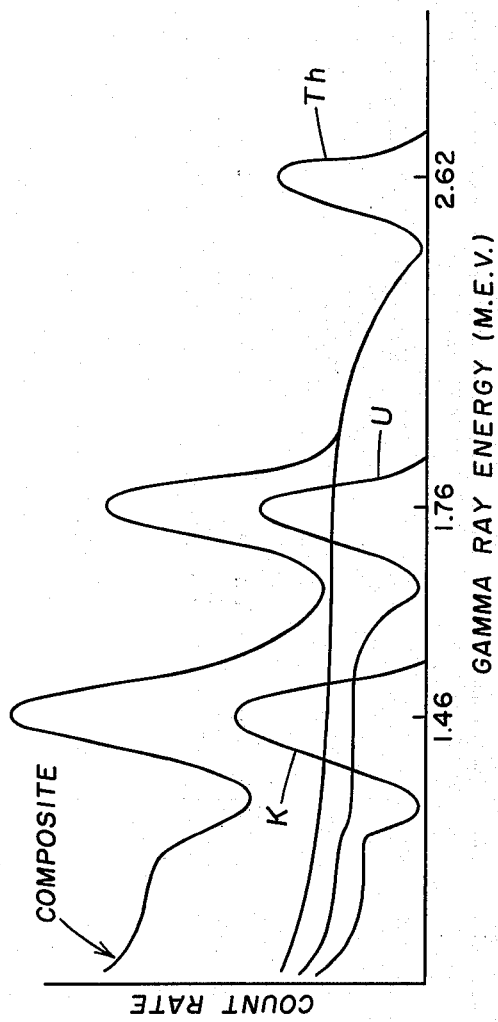
FIG. 2 illustrates the energy bands in which the natural gamma radiation of the radioactive elements to be measured by the system of FIG. 1 exhibit peak intensities.

Referring now to FIG. 1, a borehole logging tool 5 measures the natural gamma radiation emitted by the subsurface formation 6. The borehole tool 5 includes a gamma-ray detector 7 and an amplifier 8. The gamma-ray detector 7 preferably includes the scintillation type detector 10 (e.g., a crystal of sodium iodide activated with thallium) which cooperates with a photomultiplier tube 11 to detect the natural gamma radiation. The sodium iodide gives off quanta of light energy called photons, the intensity of which is proportional to the energy of the gamma-ray interaction in the sodium iodide crystal. The photomultiplier tube responds to these photons to produce a succession of pulses having magnitudes proportional to the energy of the gamma rays. These pulses are sent uphole by way of the amplifier 8 and the logging cable 9 to be discriminated into three separate energy bands by the energy band selectors 13–15. Selector 13 includes a discriminator 16 which passes a band of energy centered about 1.46 MEV, the energy level at which potassium exhibits peak intensity as can be seen in the spectrogram of FIG. 2. Selector 14 includes a discriminator 17 which passes a band of energy centered about 1.76 MEV, at which energy level uranium exhibits peak intensity. Similarly, selector 15 includes a discriminator 18 which passes a band of energy centered about 2.62 MEV, the energy level at which thorium exhibits peak intensity. The pulses within each of these separate energy bands are applied to separate count rate meters 19–21 which provide outputs $K_M$, $U_M$, and $Th_M$ having magnitudes indicative of the number of photons within each of the respective energy bands.

However, because of the abundance of lower energy scattered radiation and the increase in capture resolution of a sodium iodide scintillation crystal with a decrease in energy, the higher energy radioactive elements influence the measurements of the lower energy radioactive elements. Consequently, the outputs $K_M$ and $U_M$ do not represent the in-situ measured natural gamma radiation solely of potassium and uranium. For example, as illustrated in FIG. 2, the contribution of both uranium and thorium in the selected energy band for potassium centered about 1.46 MEV is significant. Consequently, the relation between the correct value $K_C$ of the potassium content and the measured value $K_M$ is:

$$K_C = K_M - R_1 U_C - R_2 Th_C \qquad (1)$$

where, $R_1$ = contribution to the count rate in the selected potassium energy band attributable to the correct uranium value $U_C$ expressed as a fraction of the counts in the selected uranium energy band, and $R_2$ = contribution to the count rate in the selected potassium energy band attributable to the correct thorium value $Th_C$ expressed as a fraction of the counts in the selected thorium energy band.

Further, the contribution from potassium in the selected energy band for uranium centered about 1.76 MEV is negligible, while the contribution from thorium is significant. The equation relating the correct value $U_C$ of the uranium content to the measured value $U_M$ is consequently:

$$U_C = U_M - R_3 Th_C \qquad (2)$$

where, $R_3$ = contribution to the count rate in the selected uranium energy band attributable to the correct thorium value $Th_C$ expressed as a fraction of the counts in the selected thorium energy band.

The contribution from both potassium and uranium in the selected energy band for thorium centered about 2.62 MEV is negligible. Consequently, the equation relating the correct value $Th_C$ of the thorium content to the measured value $Th_M$ of the thorium content is:

$$Th_C = Th_M \qquad (3)$$

These contributions $R_1$, $R_2$, and $R_3$ are commonly termed "stripping constants" and it is a specific aspect of the present invention to provide both a method and apparatus for operating upon these measured values $K_M$ and $U_M$ in accordance with the values of these stripping constants to obtain corrected values $K_C$ and $U_C$. As illustrated in FIG. 1, this operation is carried out by a stripping unit 22 which, as will be hereinafter described, provides for the corrected outputs $K_C$, $U_C$, and $Th_C$. These corrected outputs may then be recorded as three separate graphs on a conventional X-Y plotter 23.

Figure 3:
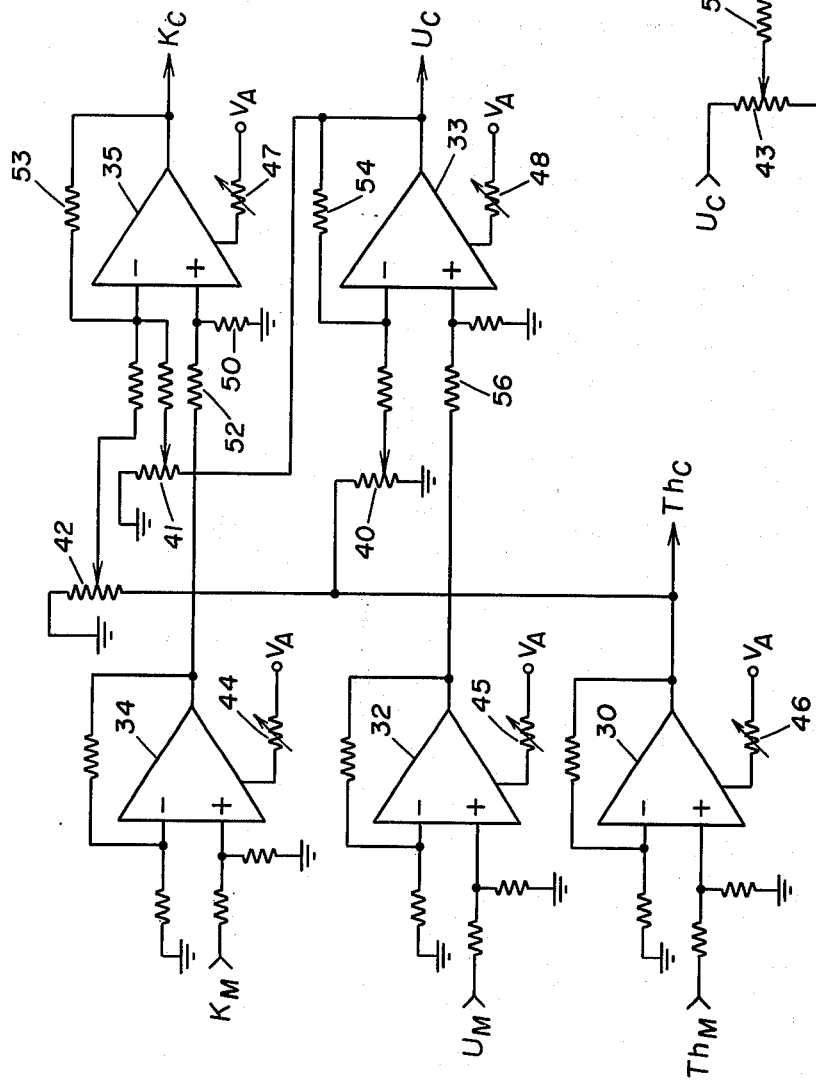
FIGS. 3 and 4 are detailed schematic drawings of the stripping unit of the borehole logging system of FIG. 1.

Referring now to FIG. 3, the stripping unit 22 will be described in detail. Stripping unit 22 comprises three analyzer channels: a potassium channel, a uranium channel, and a thorium channel. The thorium channel includes the buffer amplifier 30 to which the $Th_M$ signal is applied. Since the thorium measurement needs no stripping, the $Th_M$ signal is passed through buffer amplifier 30 as the $Th_C$ signal in accordance with the operation of Equation (3).

The uranium channel includes the buffer amplifier 32 to which the $U_M$ signal is applied. After passing through amplifier 32, the $U_M$ signal is applied to the positive input of an output amplifier 33. Connected to the negative input of amplifier 33 by way of the variable resistor 40 is the $Th_C$ signal from the thorium channel. Amplifier 33 takes the difference between these inputs and produces the output signal $U_C$ which is the uranium measurement stripped of the influence from thorium in accordance with the expression of Equation (2).

The potassium channel includes the buffer amplifier 34 to which the $K_M$ signal is applied. After passing through amplifier 34, the $K_M$ signal is applied to the positive input of the output amplifier 35. Connected to the negative input by way of the variable resistor 42 is the $Th_C$ signal from the thorium channel. Also connected to the negative input by way of the variable resistor 41 is the $U_C$ signal from the uranium channel. Amplifier 35 takes the difference between these inputs and produces the output signal $K_C$ which is the potassium measurement stripped of the influence from both thorium and uranium in accordance with the expression of Equation (1).

The particular settings of the variable resistors 40–42 to permit the uranium and potassium channels to perform the operation of Equations (1) and (2) when the stripping unit is supplied with radioactivity measurements from a borehole logging tool during logging operations are made as follows. The borehole logging tool prior to being lowered into the borehole is first exposed to a source of thorium gamma radiation. This radioactivity, after being detected and amplified by means of the crystal 10, photomultiplier tube 11, and amplifier 12, is passed through the three energy band selectors 13–15 to provide for the $K_M$, $U_M$, and $Th_M$ inputs to the stripping unit 22. The $Th_C$ output of the thorium channel of the stripping unit represents the correct thorium radioactivity. The $U_M$ signal of the uranium channel is then stripped of the influences from the thorium source in the selected energy band of the U discriminator 14 by adjusting the variable resistor 40 so that the uranium channel provides a $U_C$ output of zero. The $K_M$ signal of the potassium channel is also stripped of the influence from the thorium source in the selected energy band of the K discriminator 13 by adjusting the variable resistor 42 so that the potassium channel provides a $K_C$ output of zero.

Then, the source of thorium gamma radiation is removed and the borehole tool is next exposed to a source of uranium gamma radiation. With this source, the $Th_C$ output is zero and the $U_C$ output represents the correct uranium radioactivity. The $K_M$ signal of the potassium channel is then stripped of the influence from the uranium source in the selected energy band of the K discriminator 13 by adjusting the variable resistor 41 so that the potassium channel provides a $K_C$ output of zero.

As a measure of the accuracy of the settings of resistors 40–42, the borehole tool may then be exposed to a source of potassium gamma radiation. Under this condition, both the $Th_C$ and $U_C$ outputs should be zero and the $K_C$ output should represent the correct potassium radioactivity. The stripping unit 22 is now calibrated and ready for use as a part of the borehole logging system described above in a radioactivity logging system.

The foregoing embodiment of the invention is illustrative of one system that is suitable for use in measuring the potassium, uranium, and thorium content of the earth formations with a gamma-ray detector such as a sodium iodide scintillation crystal with a great enough capture resolution that the energy measurement of a particular radioactive element is not influenced by other radioactive elements. However, to increase the sensitivity of such a gamma-ray detector, it is necessary to increase the size of the sodium iodide crystal which in turn increases the capture resolution, causing the uranium element to influence the measurement of the thorium element. It is therefore a further aspect of the present invention to provide additional means for stripping the uranium influence from the thorium measurement as follows:

$$Th_c' = Th_c - R_4 U_c \qquad (4)$$

where, $R_4$ = contribution to the count rate in the selected thorium energy band attributable to the correct uranium value $U_c$ expressed as a fraction of the counts in the selected uranium energy band.

Figure 4:
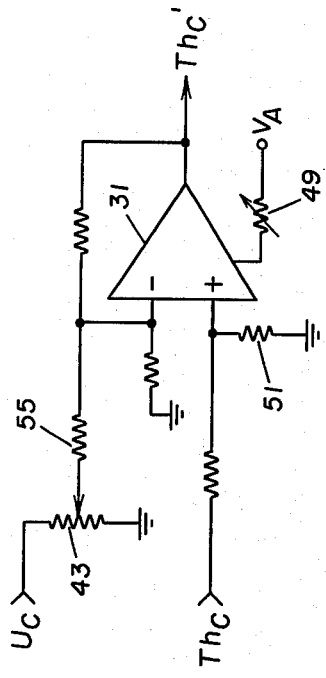

Reference is now made to FIG. 4 which illustrates one embodiment of the invention for carrying out the operation of Equation (4). The $Th_c$ signal from the buffer amplifier 30 is applied to the positive input of the operational amplifier 31. Connected to the negative input of amplifier 31 by way of the variable resistor 43 is the $U_c$ signal from the uranium channel. Amplifier 31 takes the difference between these inputs and produces the output signal $Th_c'$ which is the thorium measurement stripped of the influence from uranium in accordance with the expression of Equation (4).

Similar to the operation of adjusting the variable resistors 40–42 in the potassium and uranium channels, the variable resistor 43 is adjusted to remove the influence of uranium in the thorium channel by exposing the borehole tool to a source of uranium gamma radiation and adjusting variable resistor 43 so that the thorium channel provides a $Th_c'$ output of zero.

The stripping unit 22 has now been described in accordance with the operation of amplifiers 30–35 and the variable resistors 40–43 of FIGS. 3 and 4. The remaining components of the stripping unit 22 supply the necessary bias conditions for its operation. It is to be understood that the individual components of such a borehole logging system, including the compensation unit 22, are merely representative of one embodiment of the invention. In accordance with such embodiment, the following sets forth specific types and values of components.

| Reference Designation | Description |
| --- | --- |
| Photomultiplier 11 | EMI 9727B (Gemcon Div. of Emitronics) |
| Discriminators 16–18 | Model 1431 (Canberra) |
| Count rate meters 19–21 | Model 1481 (Canberra) |
| Operational amplifiers 30–35 | 3307 (Burr-Brown) |
| Variable resistors 40–42 | 5 Kohms |
| Variable resistor 43 | 20 Kohms |
| Variable resistors 44–49 | 500 ohms |
| Resistor 50 | 51 Kohms |
| Resistor 51 | 91 Kohms |
| Resistors 52–56 | 1 Mohm |
| All other resistors | 100 Kohms |
| $V_A$ | +15 VDC |

We claim:

1. In a system for determining the amounts of natural gamma radiation from potassium, uranium, and thorium in the earth formations and having a gamma-ray detector which provides an output representative of the total natural gamma radiation and three energy band selectors which discriminate the count rate output of the gamma-ray detector into potassium, uranium, and thorium energy band signals centered, respectively, about the energy levels at which potassium, uranium, and thorium exhibit peak gamma radiation intensities, the improvement comprising:
   a. first means for producing the fraction of the count rate in the thorium energy band signal that represents the contribution of thorium gamma radiation to the total count rate of the uranium energy band signal,
   b. second means for subtracting said fraction of the count rate of the thorium energy band signal from said total count rate of the uranium energy band signal,
   c. third means for producing the fraction of the count rates in the uranium and thorium energy band signals that respectively represent the contributions of uranium gamma radiation and thorium gamma radiation to the total count rate of the potassium energy band signal, and
   d. fourth means for subtracting said fractions of the count rates of the thorium and uranium energy band signals from said total count rate of the potassium energy band signal.

2. The system of claim 1 wherein:
   a. said second means includes a first operational amplifier having a first input supplied by the count rate of said uranium energy band signal,
   b. said first means includes a first variable resistance connected to a second input of said first operational amplifier and through which is applied that fraction of the count rate of said thorium energy band signal that represents the contribution of thorium gamma radiation to the total count rate of the uranium energy band signal,
   c. said fourth means includes a second operational amplifier having a first input supplied by the count rate of said potassium energy band signal, and
   d. said third means includes second and third variable resistances connected to a second input of said second operational amplifier and through which are applied the fractions of the count rates of said thorium and uranium energy band signals that represent the contributions of thorium and uranium gamma radiation to the total count rate of the potassium energy band signal.

3. The system of claim 1 further including:
   a. fifth means for producing the fraction of the count rate in the uranium energy band signal that represents the contribution of uranium gamma radiation to the total count rate of the thorium energy band signal, and
   b. sixth means for subtracting said fraction of the count rate of the uranium energy band signal from said total count rate of the thorium energy band signal.

4. The system of claim 3 wherein:
   a. said sixth means includes an operational amplifier having one input supplied by the count rate of said thorium energy band signal, and
   b. said fifth means includes a variable resistance connected to the other input of said operational amplifier and through which is applied that fraction of the count rate of said uranium band energy signal that represents the contribution of uranium gamma radiation to the total count rate of the thorium energy band signal.

5. In a system for determining the amounts of natural gamma radiation from potassium, uranium, and thorium in the earth formations and having a gamma-ray detector which provides an output representative of the total natural gamma radiation and three energy band selectors which discriminate the output of the gamma-ray detector into potassium, uranium, and thorium energy band signals centered, respectively, about the energy levels at which potassium, uranium, and thorium exhibit peak gamma radiation intensities, the improvement comprising:
   a. first means for adjusting the amplitude of said uranium energy band signal by the fraction of the thorium energy band signal that would reduce said uranium energy band signal to zero when the gamma-ray detector is exposed to a source of thorium gamma radiation, and
   b. second means for adjusting the amplitude of said potassium energy band signal by the fractions of the thorium and uranium energy band signals that would reduce said potassium energy band signal to zero when the gamma-ray detector is exposed separately to a source of thorium gamma radiation and to a source of uranium gamma radiation.

6. A method of logging for the natural gamma radiation from potassium, uranium, and thorium in the earth formations surrounding a borehole by means of a borehole logging tool having a gamma-ray detector and three energy band selectors which discriminate the count rate output of the gamma-ray detector into potassium, uranium, and thorium energy band signals centered, respectively, about the energy levels at which potassium, uranium, and thorium exhibit peak gamma radiation intensities, comprising the steps of:
   a. lowering the logging tool into the borehole to provide potassium, uranium, and thorium energy band signals representative of the natural gamma radiation of the earth formations surrounding the borehole,
   b. compensating the count rates in the potassium and uranium energy band signals from step (a) by the fraction of the count rate of the thorium energy band signal that represents the contribution of thorium gamma radiation on the count rates in the potassium and uranium energy band signal, and
   c. compensating the count rate in the potassium energy band signal from step (a) by the fraction of the count rate of the uranium energy band signal that represents the contribution of uranium gamma radiation on the count rate in the potassium energy band signal.

7. The method of claim 6 further including the steps of:
   a. compensating the count rate in the thorium energy band signal from step (a) by the fraction of the count rate of the uranium energy band signal that represents the contribution of uranium gamma radiation on the count rate in the thorium energy band signal.

* * * * *